(12) United States Patent
Athey et al.

(10) Patent No.: US 9,587,160 B2
(45) Date of Patent: *Mar. 7, 2017

(54) CURABLE CROSS-LINKABLE COMPOSITIONS FOR USE AS LOST CIRCULATION MATERIAL

(71) Applicant: DOW GLOBAL TECHNOLOGIES LLC, Midland, MI (US)

(72) Inventors: Phillip S. Athey, Lake Jackson, TX (US); Michael K. Poindexter, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/925,403

(22) Filed: Oct. 28, 2015

(65) Prior Publication Data

US 2016/0053157 A1 Feb. 25, 2016

Related U.S. Application Data

(60) Division of application No. 13/673,316, filed on Nov. 9, 2012, now abandoned, which is a continuation-in-part of application No. PCT/US2012/036213, filed on May 3, 2012.

(60) Provisional application No. 61/484,272, filed on May 10, 2011.

(51) Int. Cl.
| | |
|---|---|
| *C09K 8/76* | (2006.01) |
| *C09K 8/035* | (2006.01) |
| *C09K 8/508* | (2006.01) |
| *C08G 18/67* | (2006.01) |
| *C09D 175/16* | (2006.01) |

(52) U.S. Cl.
CPC ............ *C09K 8/035* (2013.01); *C08G 18/672* (2013.01); *C09D 175/16* (2013.01); *C09K 8/5086* (2013.01)

(58) Field of Classification Search
CPC ...... C09K 8/805; C09K 2208/10; C09K 8/58; C09K 8/584; C09K 8/62; C09K 8/68; C09K 2208/26; C09K 2208/30; C09K 8/24; C09K 8/36; C09K 8/44; C09K 8/5086; C09K 8/516; C09K 8/588; C09K 8/685; C09K 8/76; E21B 43/12; E21B 34/06; E21B 43/24; E21B 43/26; E21B 7/00; E21B 17/04; E21B 33/12; E21B 43/16; E21B 43/25; E21B 43/267; E21B 17/20; E21B 23/00; E21B 23/01; E21B 29/002; E21B 33/1208; E21B 31/16; E21B 33/02; E21B 33/068; E21B 33/10; E21B 33/1204; E21B 33/1293; E21B 33/13; E21B 34/04; E21B 34/066; E21B 34/16; E21B 36/001; E21B 37/02; E21B 37/08; E21B 41/0085

See application file for complete search history.

(56) References Cited

U.S. PATENT DOCUMENTS

| | | | | |
|---|---|---|---|---|
| 3,181,611 | A | | 5/1965 | Dollarhide |
| 3,798,186 | A | * | 3/1974 | Nakade ............... C09K 8/5086 166/293 |
| 4,018,851 | A | * | 4/1977 | Baccei ................. C08F 299/06 522/46 |
| 4,049,634 | A | * | 9/1977 | Ko ....................... C08F 290/06 522/107 |
| 4,295,909 | A | * | 10/1981 | Baccei ............. C08F 299/0478 156/307.3 |
| 5,241,000 | A | * | 8/1993 | Ohnari .................. C08G 18/10 525/100 |
| 7,696,133 | B2 | | 4/2010 | Cowan |
| 2009/0221452 | A1 | | 9/2009 | Whitfill et al. |
| 2010/0087566 | A1 | | 4/2010 | Ballard |
| 2011/0079389 | A1 | | 4/2011 | MacKay et al. |

FOREIGN PATENT DOCUMENTS

| | | | |
|---|---|---|---|
| EP | 0129977 | * | 1/1985 |
| EP | 0755803 | * | 1/1997 |
| WO | 2010019535 | | 2/2010 |

OTHER PUBLICATIONS

G. Malucelli, G. Gozzelino, F. Ferrero, R. Bongiovanni, A. Priola, Synthesis of poly9propylene-glycol-diacrylates and properties of the photocured networks, Journal of Applied Polymer Science, 1997, 65, 491-497.*

* cited by examiner

Primary Examiner — Kumar R Bhushan

(57) ABSTRACT

The present invention relates to compositions and methods for reducing or preventing the loss of drilling fluids and other well servicing fluids into a subterranean formation during drilling or construction of boreholes in said formation. Specifically, this invention comprises a curable cross-linkable composition capable of free radical polymerization for creating lost circulation material. The curable cross-linkable composition comprises a mixture of:

(i) an organic compound capable of free radical (co)polymerization $$(F_{p1}L)_xQ_1$$

and (ii) a reactive diluent $$(F_{p2}L)_yQ_2.$$

10 Claims, No Drawings

CURABLE CROSS-LINKABLE COMPOSITIONS FOR USE AS LOST CIRCULATION MATERIAL

FIELD OF THE INVENTION

The present invention relates to compositions and methods for reducing or preventing the loss of drilling fluids and other well servicing fluids into a subterranean formation during drilling or construction of boreholes in said formation. Specifically, this invention comprises a curable cross-linkable composition for creating lost circulation material and a method of use thereof.

BACKGROUND OF THE INVENTION

In the oil and gas industry, a common problem in drilling wells or boreholes in subterranean formations is the loss of circulation materials, such as fluids (for example, drilling fluids or muds), in a well or borehole during the drilling. Such lost fluids typically go into fractures induced by excessive mud pressures, into pre-existing open fractures, and/or into large openings with structural strength in the formation.

A large variety of materials have been used or proposed in attempts to cure lost circulation. Generally, such materials may be divided into five types or categories: fibrous materials, such as shredded automobile tires or sawdust; flaky materials, such as wood chips and mica flakes; granular materials, such as ground nutshells; slurries, whose strength increases with time after placement, such as hydraulic cement; and polymerizable compositions.

Polymerizable compositions comprise one or more monomer, typically, comprising optional components, such as for example fillers, which cure in-situ downhole. Various polymerizable compositions are known and may comprise such polymerizable and/or polymeric materials as an epoxy resin, an organic siloxane, a phthalate resin, a (meth)acrylate resin, an isocyanate-based resin, a polyacrylamide, or the like. For examples see U.S. Pat. Nos. 3,181,611 and 7,696,133; and US Publication No. 2009/0221452 and 2010/0087566; and WO 2010/019535, each of which is incorporated by reference herein in their entirety. More specifically, US Publication No. 2011/0079389A1 discloses the use of a polymerizable composition made of a polymerization initiator and acrylate based monomers polymerizable by frontal polymerization which is activated through an external trigger. Such a process is based on free radical polymerization chemistry.

Although many materials and compositions exist and have been proposed for preventing lost circulation, there continues to be a need for even more versatile and better compositions and methods for preventing loss of circulation.

SUMMARY OF THE INVENTION

The present invention provides such a curable cross-linkable composition useful as a drilling well lost circulation material comprising:

i from 40 to 90 weight percent of an organic compound capable of free radical (co)polymerization described by the following formula:

$$(F_{p1}-L)_x-Q_1$$

wherein:

x is an integer from 2 to 8;

L is a moiety comprising an aromatic or an aliphatic group derived from a diisocyanate wherein one of the isocyanate groups reacts with a reactive group on $Fp_1$ to form a first bond and the second isocyanate group reacts with a hydroxyl group on $Q_1$ to form a urethane link;

$Fp_1$ is a moiety derived from an organic compound with a reactive group and one or more free radical polymerizable group wherein the reactive group reacts with a first isocyanate group on L to form a first bond; and $Q_1$ is a moiety derived from a substituted or unsubstituted organic polyol comprising two or more hydroxyl groups wherein the moiety comprises an alkyl group, alkylene group, alkenyl group, cycloalkyl group, cycloalkylene group, aryl group, aralkyl group, alkaryl group, poly(oxyalkylene) group, poly(carboalkoxyalkylene) group, substituted heterocyclic group, or unsubstituted heterocyclic group wherein $Q_1$ has a molecular weight of from 400 to 4,000 and each hydroxyl group reacts with am isocyanate on an L to form a urethane link;

and ii from 10 to 60 weight percent of a reactive diluent described by the following formula:

$$(F_{p2})_y-Q_2$$

wherein:

y is an integer from 2 to 8;

$Fp_2$ is a moiety derived from an organic compound with a reactive group which reacts with a hydroxyl group on $Q_2$ to form a bond, $Fp_2$ comprises one or more free radical polymerizable group, and $Fp_2$ may be the same or different than $Fp_1$;

and $Q_2$ is a moiety derived from a substituted or unsubstituted organic polyol comprising two or more hydroxyl groups wherein the moiety comprises an alkyl group, alkylene group, alkenyl group, cycloalkyl group, cycloalkylene group, aryl group, aralkyl group, alkaryl group, poly(oxyalkylene) group, poly(carboalkoxyalkylene) group, substituted heterocyclic group, or unsubstituted heterocyclic group wherein $Q_1$ has a molecular weight of from 60 to 500 and each hydroxy group reacts with the reactive group on a $Fp_2$ to form a bond, $Q_2$ may the same or different than $Q_1$ wherein weight percent is based on the total weight of the curable cross-linkable composition.

In one embodiment of the present invention, the moieties comprising a free radical polymerizable group ($Fp_1$ and $Fp_2$) of the curable cross-linkable composition disclosed herein above independently comprise a vinyl ether, a vinyl ester, an allyl ether, an allyl ester, a vinyl ketone, styrene, α-methylstyrene, a vinyl amide, an allyl amide, an acrylamide, a maleate, or a fumarate, preferably said moieties comprising a free radical polymerizable groups ($Fp_1$ and $Fp_2$) are independently derived from a (meth)acrylate.

In another embodiment of the curable cross-linkable composition disclosed herein above, the bond connecting the organic compound with a reactive group ($Fp_1$) to the moiety (L) derived from a diisocyanate is a urethane link.

In another embodiment of the present invention of the curable cross-linkable composition disclosed herein above, the polyvalent organic radical ($Q_1$) is derived from a polyethylene oxide polyol, a polypropylene oxide polyol, a polybutylene oxide polyol, a copolymer of polyalkylene oxide polyol, a terpolymer of polyalkylene oxide polyol, a polytetramethylene oxide polyol, a polyalkylene oxide based on a polyol, a polyester polyol, or a polycarbonate, preferably the polyvalent organic radical ($Q_1$) is derived from a polyethylene oxide polyol or a polypropylene oxide polyol and the polyvalent organic radical ($Q_2$) is derived from a polyhydroxyl compound, preferably ethylene glycol, trimethylol propane (TMP), 1,2 propylene glycol, glycerine, pentaerythritol, sorbitol, or sucrose.

In one embodiment of the present invention, the reactive diluent of the curable cross-linkable composition disclosed herein above is trimethylolpropanetri(meth)acrylate, glycerine tri(meth)acrylate, pentaerythritol tetra(meth)acrylate, triethyleneglycol dimethacrylate, ethyleneglycol dimethacrylate, tetraethyleneglycol dimethacrylate, polyethyleneglycol diacrylate, polyethyleneglycol dimethacrylate, 1,3-butyleneglycol dimethacrylate, trimethylol propane trimethacrylate, neopentylglycoldimethacrylate, ethoxylated Bisphenol A dimethacrylate, Bisphenol F dimethacrylate, propoxylated Bisphenol C dimethacrylate, Bisphenol A bis(2-hydroxypropyl)dimethacrylate, butanediol di(meth)acrylate, or mixtures thereof.

In yet another embodiment of the present invention, the curable cross-linkable composition disclosed herein above further comprises one or more initiator selected from a peroxide, a peroxy ester, a peroxy carbonate, a hydroperoxide, an alkylperoxide, an arylperoxide, or an azo compound, preferably the initiator is benzoyl peroxide, tert-butyl peroxide, dicumyl peroxide, hydrogen peroxide, diethyl peroxide, azobisisobutyronitrile, or mixtures thereof. The temperature of the loss circulation zone is used to dictate the choice of initiator, ensuring that the initiator remains passive until the thermal environment of the loss circulation zone activates the initiator. Preferably, the one or more initiator is independently (if more than one) present in an amount equal to or greater than 0.1 weight percent and equal to or less than 10 weight percent based on the total weight of the curable cross-linkable composition.

In yet another embodiment of the present invention, the curable cross-linkable composition disclosed herein above further comprises a one or more inhibitor, preferably the one or more inhibitor is hydroquinone, butylated hydroxytoluene (BHT), butylated hydroxyaniline (BHA), 2-hydroxy-4-methoxy benzophenone (UV-9), methyl ether hydroquinone (MEHQ), or 4-benzyloxy phenol, 3,5-diisopropyl phenol, or mixtures thereof. Preferably, the one or more inhibitor is independently (if more than one) present in an amount equal to or greater than 0.1 weight percent and equal to or less than 10 weight percent based on the total weight of the curable cross-linkable composition.

DETAILED DESCRIPTION OF THE EMBODIMENTS

The present invention is a curable cross-linkable composition useful as a drilling well lost circulation material, said curable cross-linkable composition comprising a mixture of:
(i) an organic compound capable of free radical (co)polymerization described by the following formula:

$(F_{p1}\text{-L})_x\text{-}Q_1$ 

wherein $Q_1$ represents the backbone of the compound, $Fp_1$ represents a moiety comprising a free radical polymerizable group, and L represents a moiety that links $Q_1$ to $Fp_1$ and
(ii) an reactive diluent described by the following formula:

$(F_{p2})_y\text{-}Q_2$ 

wherein $Q_2$ represents the backbone of the compound, $Fp_2$ represents a moiety comprising a free radical polymerizable group.

In the organic compound capable of free radical (co)polymerization (i) and the organic cross-linking compound, also referred to as the reactive diluent (ii) the moieties comprising a free radical polymerizable group ($Fp_1$ and $Fp_2$) independently comprise at least one ethylenically unsaturated group that undergoes free radical initiated polymerization. Preferably, the organic compound capable of free radical (co)polymerization (i) and/or the reactive diluent (ii) comprise more than one ethylenically unsaturated, free radical polymerizable group. This is achievable by having more than one $Fp_1$ linked to the backbone $Q_1$ and/or $Fp_2$ linked to the backbone $Q_2$, for example, x is equal to or greater than 2, preferably equal to or less than 8. In the herein above formulas, x is selected from 2, 3, 4, 5, 6, 7, and/or 8. For $Q_2$, y is equal to or greater than 2, preferably equal to or less than 8. In the herein above formulas, y is selected from 2, 3, 4, 5, 6, 7 and/or 8. Moreover the moiety comprising a free radical polymerizable group $Fp_2$ may be the same moiety comprising a free radical polymerizable group as $Fp_1$ or $Fp_2$ may be a different moiety comprising a free radical polymerizable group than $Fp_1$.

Preferably, the organic compound capable of free radical (co)polymerization (i) is present in an amount of equal to or greater than 40 weight percent, more preferably equal to or greater than 50 weight percent, more preferably equal to or greater than 60 weight percent wherein weight percents are based on the total weight of the curable cross-linkable composition. Preferably the organic compound capable of free radical (co)polymerization (i) is present in an amount of equal to or less than 90 weight percent, more preferably 80 weight percent, wherein weight percents are based on the total weight of the curable cross-linkable composition.

Preferably the reactive diluent (ii) is present in an amount of equal to or greater than 10 weight percent, more preferably equal to or greater than 15 weight percent, more preferably equal to or greater than 20 eight percent wherein weight percents are based on the total weight of the curable cross-linkable composition. Preferably the reactive diluent (ii) is present in an amount of equal to or less than 60 weight percent, more preferably 50 weight percent, more preferably equal to or less than 40 weight percent, wherein weight percents are based on the total weight of the curable cross-linkable composition.

Hereinafter, the moieties comprising one or more free radical polymerizable group ($Fp_1$ and $Fp_2$) are referred to as being derived from a general type or specific compound having a reactive group. L is a moiety derived from a diisocyanate. When a compound from which $Fp_1$ is derived and a diisocyanate compound from which L is derived are reacted or linked together, through the formation of a bond. In other words, the remnant of the compound from which $Fp_1$ is derived is linked to the diisocyanate remnant from which L is derived through a bond. For example, if the reactive group on $Fp_1$ is a hydroxyl group, the bond formed between it and an L is a urethane link. Likewise, the compound from which $Q_1$ is derived comprises two or more hydroxyl group and when a hydroxyl group is reacted with an isocyanate group on an L, a urethane bond links the moiety (or remnant) from L to the moiety (remnant) from $Q_1$. For example, in Scheme 1, the remnant of 2-hydroxyethyl methacrylate (HEMA) ($Fp_1$) is bonded to the remnant of toluene diisocyanate (L) through a urethane link and the remnant of the toluene diisocyanate (L) is bonded to the remnant of a poly(propylene glycol) ($Q_1$) through a urethane link.

which $Fp_1$ is derived, the link between L and $Fp_1$ may independently be a urethane group or a urea group.

Among the useful diisocyanates are ethylene diisocyanate, ethylidene diisocyanate, propylene diisocyanate, butylene diisocyanate, hexamethylene diisocyanate (including dimers and trimers thereof), dichlorohexamethylene diiso- Scheme 1

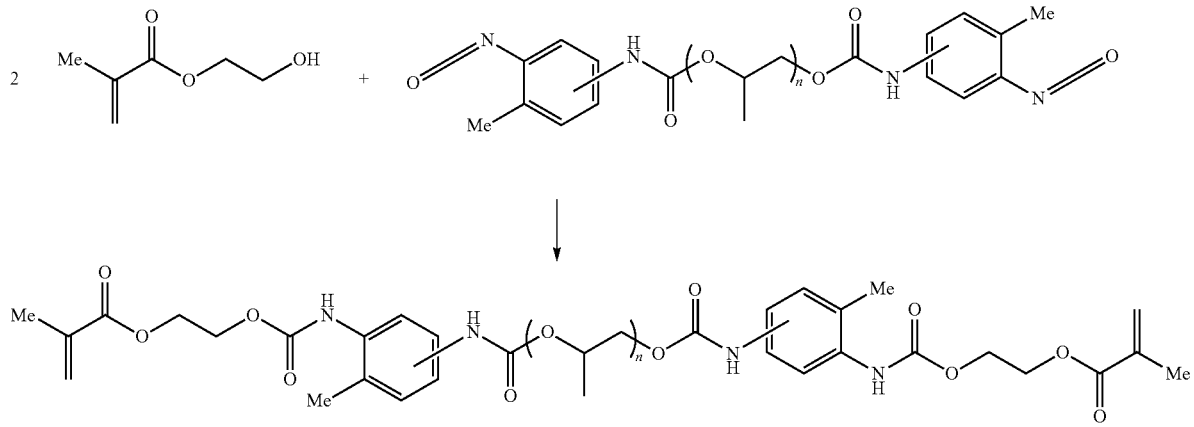

Another example, is when a compound from which $Fp_2$ is derived and the compound from which $Q_2$ is derived are reacted together, a bond or linkage is formed and a remnant of the compound from which $Fp_2$ is derived is linked to the remnant of the compound from which $Q_2$ is derived. For example, in Scheme 2, acrylic acid ($Fp_2$) is linked to trimethylol propane (TMP), through an ester bond:

Scheme 2

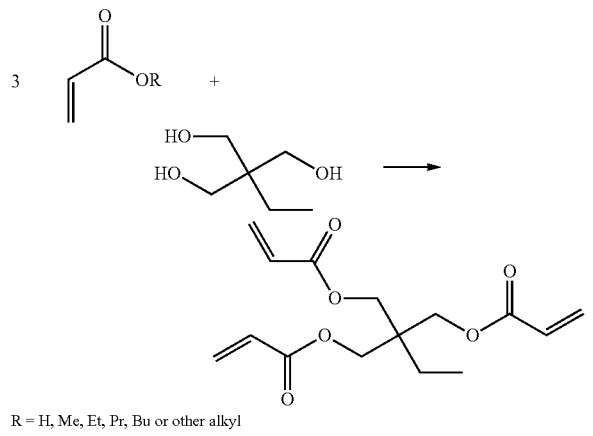

R = H, Me, Et, Pr, Bu or other alkyl

In other words, it is understood that a post-reacted compound is referred to as the moiety derived from said compound. For example, a toluene moiety (L) bonded through a urethane link to $Fp_1$ and a urethane link to $Q_1$ is derived from a toluene diisocyanate.

Suitable isocyanates from which the moiety L is derived may be alkyl, aryl, and/or aralkyl. Preferably the moiety is derived from a diisocyanate. The diisocyanate may comprise a (substituted) aromatic or (substituted) aliphatic group comprising one or more O, N, S, or combinations thereof. Depending on the compositions of the compound from cyanate, cyclopentylene-1,3-diisocyanate, cyclohexylene-1, 4-diisocyanate, cyclohexylene-1,2-diisocyanate, isophorone diisocyanate, furfurylidene diisocyanate, toluene diisocyanate, 2,2-diphenylpropane-4,4'diphenylmethane diisocyanate, p-phenylene diisocyanate, m-phenylene diisocyanate, xylene diisocyanate, 1,4-naphthylene diisocyanate, 1,5-naphthylene diisocyanate, m-tetramethyl xylene diisocyanate, polymeric versions of 4,4'-methylene diphenyl diisocyanate, diphenyl-4,4'diisocyanate, azobenzene-4,4'-diisocyanate, diphenylsulphone-4,4'-diisocyanate, and 1-chlorobenzene-2,4-diisocyanate. If $Fp_1$ is derived from an acrylic monomer, then highly crystalline aromatic materials that are insoluble in acrylic monomer (e.g., pure 4,4'-methylene diphenyldiisocyanate) would not be used. Preferred diisocyanates are toluene diisocyanate (TDI), diphenylmethane diisocyanate (MDI), hexamethylene-1,6-diisocyanate (HDI), naphthalene diisocyanate (NDI), methylene bis-cyclohexylisocyanate (HMDI or hydrogenated MDI), isophorone diisocyanate (IPDI), and the like.

Alternatively, tri- and/or a tetraisocyanates may be used for L, such as 4,4',4"-triisocyanatotriphenylmethane, 1,3,5-triisocyanatobenzene, 2,4,6-triisocyanatotoluene, and 4,4'dimethyldiphenylmethane-2,2',5,5'-tetraisocyanate.

In another embodiment, $L$-$Q_1$ is derived from a prepolymer (i.e., isocyanate terminated polyetherpolyol) which is reacted with a compound comprising a free radical polymerizable group (from which the moiety comprising the free radical polymerizable group $Fp_1$ is derived) having a labile or active hydrogen containing compound. The isocyanate-terminated prepolymer may be prepared by reacting a diol or polyol with a diisocyanate, whose NCO functionality is about two, to form a prepolymer having terminal isocyanate groups. Polyisocyanates from which L is preferably derived include various aliphatic, cycloaliphatic, aromatic, and mixed (cyclo)aliphatic-aromatic diisocyanates. In general aromatic diisocyanates are preferred, especially when utilized to prepare isocyanate prepolymers or quasi prepolymers.

In the broadest terms, $Q_1$ is a polyol comprising two or more hydroxyl groups and $Q_2$ is a polyol comprising two or more hydroxyl. The hydroxyl group may be an alcohol or a carboxylic acid. Preferably, the hydroxyl group is an alcohol.

Suitable polyols include polyether polyols, polyester polyols, polycarbonate polyols, silyl carbinols and polyolefin hydroxyl terminated polyols. Preferably, the polyol has a hydroxyl functionality of 2 to 8, preferably 2 to 6, more preferably 2 to 4, and more preferably 2 to 3. Among those polyols which are particularly preferred are polyalkylene oxide polyols such as polyethylene oxide polyol, polypropylene oxide polyol, polytetramethylene oxide polyol, ethylene oxide- and propylene oxide-terminated derivatives.

Polyether polyols are particularly preferred for use in the backbone $Q_1$ and $Q_2$ of the present invention and may comprise the polymerization product of epoxides with either water or polyhydric alcohol sometimes referred to as a polyol initiator. Illustrative epoxides that may be employed in the preparation of polyether polyols useful in the invention include short chain (e.g., about 2 to 8, preferably 2 to 6 carbon atoms) alkylene oxides such as ethylene oxide, propylene oxide, butylene oxide and amylene oxide; glycidyl ethers such as t-butyl glycidyl ether and phenyl glycidyl ether; and random or block copolymers of two or more of these epoxides.

Suitable polyhydric alcohols that may be employed as a polyol initiator for making polyether polyols suitable for use in the invention preferably have from two to eight hydroxyl groups and include short chain diols (e.g., having about 2 to 7 carbon atoms) such as ethylene glycol, 1,2-propane diol, 1,4-butane diol, 1,3-butane diol, 1,5-pentane diol, and 1,7-heptane diol; compounds derived from phenols such as bis-phenol A; and materials having more than two hydroxyl groups such as gycerol, 1,1,1-trimethylolpropane, 1,1,1-trimethylolethane, hexane-1,2,6-triol, α-methyl glucoside, pentaerythritol, pentatols, hexatols, and various sugars (e.g., glucose, sucrose, fructose, sorbitol, and maltose).

One such polyol suitable for use in the present invention is a polyalkylene polyether polyol (sometimes referred to as polyalklene oxide polyols). Polyalkylene polyether polyols may be prepared from the short chain alkylene oxides described herein above as well as other starting materials such as tetrahydrofuran and epihalohydrins such as epichlorohydrin. Alkylene oxide tetrahydrofuran copolymers may also be used. Also useful are arylene oxides such as styrene oxide which can be used to form polyarylene oxide polyols. The most preferred polyalkylene polyether polyols are polypropylene oxide polyol, polyethylene oxide polyol, and polytetramethylene oxide polyol, including ethylene oxide or propylene oxide-terminated derivatives thereof.

Polyester polyols are also useful as compounds comprising the backbone $Q_1$ and/or $Q_2$ of the present invention and may be prepared by reacting one or more diols with one or more dicarboxylic acids. Diols which may be used to make polyester polyols useful in the invention include saturated diols having the general structure HO—$(CH_2)_y$—OH where the integral value of y is about 2 to 8, preferably 2 to 6, examples of which include ethylene glycol, propylene glycol, 1,4-butane diol, and 1,6-hexane diol. Dicarboxylic acids which may be used to make polyester polyols useful in the invention include saturated dicarboxylic acids having the general structure HOOC—$(CH_2)_z$—COOH where the integral value of z is about 0 to 8, examples of which include adipic acid and sebacic acid. Aromatic dicarboxylic acids may also be used.

Polyester polyols based on poly-ε-caprolactone are particularly preferred and can be obtained from a ring-opening polymerization of ε-caprolactone. The CAPA™ family of poly-ε-caprolactone polyols from Solvay are particularly useful materials. Poly-ε-caprolactone polyols may be used singularly or in mixtures. Poly-ε-caprolactone polyols are a particularly preferred polyester polyol.

Preferably, the di- or polyvalent organic radical $Q_1$ and/or $Q_2$ of the present invention comprise a di- or polyvalent organic radical derived from a polyalkylene oxide polyol, an amine terminated polyalkylene oxide, a hydroxyl terminated polyolefin, an amine terminated polyolefin, a silyl carbinol, a (co)polystryrenic polymer, or mixtures thereof. More preferably the polyvalent organic radical $Q_1$ and/or $Q_2$ is derived from a capped or uncapped polyethylene oxide polyol, a polypropylene oxide polyol, a polybutylene oxide polyol, a copolymer of polyalkylene oxide polyol, a terpolymer of polyalkylene oxide polyol, a polytetramethylene oxide polyol, a polyalkylene oxide based on a polyol, a polyester polyol, or a polycarbonate polyol.

The viscosity of the curable cross-linkable composition of the present invention may be modified by adjusting the molecular weight of the organic radical ($Q_1$ and/or $Q_2$) so that the reaction mixture can better flow and provide favorable coverage into the reservoir openings. The wettability of the organic radical ($Q_1$ and/or $Q_2$) can also be varied to more favorably interact with and bind to water-wet, oil-wet or mixed-wet reservoirs. For example, an organic radical containing more ethylene oxide would interact better with water-wet reservoirs, while an organic radical containing more propylene oxide or butylene oxide would interact better with oil-wet reservoirs.

$Fp_1$ and $Fp_2$ are organic compounds comprising a free-radical polymerizable group preferably the free-radical polymerizable group is an alkene group. The alkene group may be unsubstituted or substituted or part of a cyclic ring structure. Substituted alkenes include those alkenes having alkyl or aryl group substitution. Preferred alkenes are those having terminal unsubstituted double bonds such as allyl or vinyl groups. Even more preferred alkenes are styryls. The most preferred alkenes are acrylic-group containing materials.

In most general terms, the moiety comprising a free radical polymerizable group ($Fp_1$ and/or $Fp_2$) comprises one or more unsaturated carbon-carbon double or triple bond. For example, the moiety comprising a free radical polymerizable group may comprise a vinyl ether, a vinyl ester, an allyl ether, an allyl ester, a vinyl ketone, styrene, α-methylstyrene, a vinyl amide, an allyl amide, an acrylamide, a maleate, a fumarate, or a (meth)acrylate. Other suitable moieties comprising a free radical polymerizable group are derived from an α,β-unsaturated acid or an ester of an α,β-unsaturated acid.

Organic compounds from which moieties comprising suitable free radically polymerizable groups are derived include the diacrylates and dimethacrylates described in U.S. Pat. Nos. 3,043,820; 3,457,212; 3,923,737; and 3,944,521, all of which are incorporated herein by reference in their entirety. Other suitable polymerizable monomers include acrylate-terminated monomers such as the polyacrylate esters formed from organic polyisocyanates, such monomers being described, for example, in U.S. Pat. Nos. 3,425,988; 4,018,351; 4,295,909; 4,309,526; and 4,380,613, all of which are incorporated herein by reference in their entirety. A preferred moiety comprising a free radical polymerizable group is derived from an acrylate or methacrylate, referred to collectively as (meth)acrylate. A particularly preferred acrylate moiety comprising a free radical polymerizable group is derived from 2-hydroxyethyl methacrylate.

In the embodiment where an isocyanate-terminated prepolymer is used, it may be reacted with an effective amount of a terminal acrylate group or a methacrylate group (herein after represented by the term (meth)acrylate) group containing compound capable of converting the terminal isocyanate groups on the first prepolymer to terminal (meth)acrylate groups. Preferably, the (meth)acrylate containing compound contains a terminal group that is either an isocyanate reactive amino, carboxylic acid, or hydroxyl group. Preferred hydroxyl compounds include hydroxylated (meth)acrylates and (meth)acrylamides, wherein the use of the parenthetical expression (meth) indicates that the methyl substitution is optional. As discussed herein above, adducts of hydroxylated (meth)acrylates or (meth)acrylamides with lactones (e.g., ε-caprolactone), so as to form hydroxy(meth)acrylate polyesters, are also particularly useful.

A preferred organic compound capable of free radical polymerization comprises the reaction product of an isocyanate prepolymer with a hydroxylated (meth)acrylate such as hydroxyethylmethacrylate, hydroxyethylacrylate, hydroxybutylacrylate or adducts of these hydroxylated (meth)acrylates with ε-caprolactone.

Other suitable compounds for capping an isocyanate terminated polyetherpolyol (or any substituted or unsubstituted polyvalent organic radical in general) are methacrylic acid, acrylic acid, and similar α,β-unsaturated carboxylic acids, and half-acid esters such as the 2-hydroxyethyl (meth) acrylate half-acid esters of maleic acid. Other suitable half-acid esters include those described in U.S. Pat. Nos. 3,428,614 and 4,080,238, and 4,209,604 all of which are incorporated herein by reference in their entirety.

Still other suitable monomers for capping isocyanate terminated polyetherpolyol (or any substituted or unsubstituted polyvalent organic radical in general) include the (meth)acrylate functional phosphorus containing monomers described in U.S. Pat. Nos. 4,044,044; 4,259,117; 4,434,278; and 4,442,239; all of which are incorporated by reference in their entirety.

Other suitable polymerizable monomers useful in the inventive compositions for capping isocyanate terminated polyetherpolyol (or any substituted or unsubstituted polyvalent organic radical in general) are acrylic and methacrylic functional silicones.

In one embodiment of the present invention, the organic compound capable of free radical (co)polymerization comprises a polycaprolactone acrylate capped polyol, for example see U.S. Pat. No. 4,632,975, which is incorporated herein by reference in its entirety. For example, a reactive diluent can be prepared by reacting the caprolactone polyol (from which the divalent organic compound $Q_2$ is derived) with acrylic or methacrylic acid (from which the moiety comprising a free radical polymerizable group $Fp_2$ is derived) in the presence of an acid catalyst, whereby they are linked through an ester (—OOC—) bond. The acid catalyst may be sulfuric, methane sulfonic, or p-toluene sulfonic acid, or ion exchange resins, and the like. The acid catalyst is used in amounts of from about 0.1 to about 5.0, preferably from about 0.5 to about 2.0 percent. In the reaction, one hydroxyl equivalent of the caprolactone polyol is reacted with excess of acrylic acid to form the caprolactone polyol acrylate. A hydroxyl containing methacrylated polyol can also be prepared by reacting an excess equivalent of polyol with methacrylic acid.

The curable cross-linkable composition of the present invention comprises a reactive diluent in an amount equal to or greater than 10 weight percent. Suitable reactive diluents include monomers having a (meth)acrylate group, a di(meth)acrylate, a poly(meth)acrylate, a polyethylene glycol di(meth)acrylate, a poly-propylene glycol di(meth)acrylate, butanedioldi(meth)acrylate, hexanedioldi(meth)acrylate, polybutylene glycol di(meth)acrylate, trimethylolpropanetri (meth)acrylate, one or more N-vinyl amide, or a vinyl ester.

Preferable reactive diluents are derived from acrylic monomers such as trimethylolpropanetri(meth)acrylate, glycerine tri(meth)acrylate, pentaerythritol tetra(meth)acrylate, and poly(meth)acrylates of polyols. Particularly suitable reactive diluents include triethyleneglycol dimethacrylate, ethyleneglycol dimethacrylate, tetraethyleneglycol dimethacrylate, polyethyleneglycol diacrylate, polyethyleneglycol dimethacrylate, 1,3-butyleneglycol dimethacrylate, trimethylol propane trimethacrylate, neopentylglycoldimethacrylate, ethoxylated Bisphenol A dimethacrylate, Bisphenol F dimethacrylate, propoxylated Bisphenol C dimethacrylate, Bisphenol A bis(2-hydroxy-propyl)dimethacrylate, butanediol di(meth)acrylate, or combination thereof.

An initiator is useful in the application of the present invention. The use of initiators is known in the art and the invention is not intended to be limited to any particular type. Suitable free radical initiators or initiator systems may include, for example, but not be limited to an azo compound such as azobisisobutyronitrile, a peroxide for example an alkyl or an acyl peroxide or hydroperoxide, a ketoperoxide, a peroxy ester, a peroxy carbonate, and a peroxy ketal, or mixtures thereof. Such compounds vary with respect to activation temperature and half-life or, in other words, the temperature at which their reaction is initiated. The temperature of the zone experiencing lost circulation can be used to select the initiator such that the initiator will become reactive under the reservoir conditions.

Examples of suitable alkyl peroxides include dialkyl peroxides, hydroperoxides, acyl peroxides, peroxy esters and peroxy ketals include, but are not limited to benzoyl peroxide, tert-butyl peroxide, hydrogen peroxide, diethyl peroxide, dibenzoyl peroxide, diacetyl peroxide, di-t-butyl peroxide, cumyl peroxide, dicumyl peroxide, dilauryl peroxide, t-butyl hydroperoxide, methyl ketone peroxide, acetylacetone peroxide, methylethyl ketone peroxide, dibutylperoxyl cyclohexane, di-(2,4-dichloro-benzoyl) peroxide, diisobutyl peroxide, t-butyl perbenzoate, and t-butyl peracetate, or mixtures thereof. The initiator may be employed in total amounts from about 0.1 to about 10 weight percent based upon the weight of the polymerizable monomer. For reservoirs containing ferrous iron or other metals capable of behaving as a reducing agent that polymerization can be initiated via an oxidation-reduction reaction with one of the previously listed peroxides or hydroperoxides. This type of initiation is commonly called redox initiation. For this invention, the reducing agent can also be added to the reaction mixture.

The rate of polymerization for the curable cross-linkable composition of the present invention is dictated by the temperature of the loss circulation zone, and the choice of the appropriate initiator(s) based on this temperature, such that the rate may be accelerated, reduced, or delayed by the use of one or more initiators.

Likewise, an inhibitor may be required and the curable cross-linkable composition of the present invention is not intended to be limited to any particular inhibitor. Those skilled in the art would recognize suitable inhibitors. Examples of suitable inhibitors for free radical polymerization reactions include, for example, benzoyl quinone, parabenzoquinone, tertiary butyl catechol, and the like, and mixtures thereof, which exhibit efficacy at elevated temperatures. Some inhibitors are not adequately effective at elevated temperatures. Additional examples of inhibitors include hydroquinones, such as, for example hydroquinone, methyl hydroquinone and methyl ethyl hydroquinone (MEHQ), butylated hydroxytoluene (BHT), butylated hydroxyaniline (BHA), 2-hydroxy-4-methoxy benzophenone (UV-9), 4-benzyloxy phenol, or 3,5-diisopropyl phenol. In general, the inhibitor is present in an amount equal to or greater than 0.1 weight percent, preferably equal to or greater than 0.5 weight percent, more preferably equal to or greater than 1.0 weight based on the total weight of the curable cross-linkable composition. In general, the inhibitor is present in an amount equal to or less than 10 weight percent, preferably equal to or less than 5 weight percent, more preferably equal to or less than 2 weight percent based on the total weight of the curable cross-linkable composition. The preferred quantity results in the proper exothermic process and short curing time or for example, to minimize undesired free radical polymerization under shipping and storage conditions.

An initiator is preferably used, but an inhibitor is not always necessary. When the temperature in the well is elevated, say for example, higher than 150° C., the reaction may go too fast. At that point, an inhibitor may be added, which may act as a free radical scavenger, and prevents the polymerization from proceeding too fast. Eventually, the inhibitor may be used up and the free radical or acid groups then initiate polymerization, which is subsequently self-sustaining.

A solvent may be employed to dilute the blend of the selected formulation and/or improve the wetting of the formation. The solvent should be miscible with water and hydrocarbons and may be selected from any convenient type, which would be apparent to those skilled in the art. Suitable solvents include, but are not limited to low molecular weight anhydrous alcohols such as methanol, ethanol, propanol; ethers and polyethers, such as tetrahydrofuran, dioxane, ethylene glycol monoalkyl ethers, polyethylene glycol monoalkylethers or glycol ether esters; ether alcohols such as 2-butoxyethanol, or mixtures thereof. Preferred solvents include ethylene glycol monobutyl ether, propylene glycol methyl ether acetate, and other solvents effective for dissolving the thermoplastic elastomer, or mixtures thereof. A suitable concentration of solvent can range from 0 to 50 weight percent, more preferably 1 to 35 weight percent, and most preferably 5 to 25 weight percent.

Other additives can be incorporated into the formulation including, but not limited to coupling agents, suspending agents, dyes, weighting agents, and lost circulation materials.

One particularly useful additive is a thickener such as medium (about 100,000) molecular weight polymethyl methacrylate which may be incorporated in an amount of about 10 to 40 weight percent, based on the total weight of the curable cross-linkable composition. Thickeners may be employed to increase the viscosity of the composition to a more easily room temperature applied viscous syrup-like consistency.

As will be demonstrated by way of example, strength build of the lost circulation material is best achieved when higher functionality reactive diluent are also included in the formulation. The amount of reactive diluent needs to be kept at greater than or equal to 10 percent by weight of the curable cross-linkable composition. Particular examples of suitable acrylic monomer crosslinking agents include trimethylolpropanetri(meth)acrylate, glycerine tri(meth)acrylate, pentaerythritol tetra(meth)acrylate, and poly(meth)acrylates of polyols.

Numerous coupling agents are known in the art and the invention is not intended to be limited to particular agents. In some embodiments, the coupling agent may include silane coupling agents. A suitable silane coupling agent may be selected from among vinyltrimethoxysilane, vinyltriethoxysilane, vinyl tris(β-methoxyethoxy) silane, vinylmethyldimethoxysilane, vinylmethyldiethoxysilane, δ-glycidoxypropyltrimethoxysilane, δ-glycidoxypropylmethyldimethoxysilane, δ-methacryloxypropyltrimethoxysilane, δ-methacryloxypropylmethyldimethoxysilane, acryloxypropyltrimethoxysilane, acryloxypropylmethyldimethoxysilane, and the like. A suitable concentration for a coupling agent is in the range of 0 to 10 weight percent.

Suspending agents known in the art can be added to the formulation to support solids. The invention is not intended to be limited to any particular agents, however suitable suspending agents include, for example, organophilic clays, amine treated clays, oil soluble polymers, quaternary ammonium compounds, polyamide resins, polycarboxylic acids, and soaps.

The formulation may also contain other common treatment fluid ingredients such as fluid loss control additives, dyes, anti-foaming agents when necessary, and the like, employed in typical quantities known to those skilled in the art. Of course, the addition of such other additives should be avoided if it will detrimentally affect the basic desired properties of the treatment fluid.

Weighting agents or density materials may be added to the formulation. Suitable materials include, for example, galena, hematite, magnetite, iron oxides, ilmenite, barite, siderite, celestite, dolomite, calcite, manganese oxides, magnesium oxide, zinc oxide, zirconium oxides, spinels and the like. The quantity of such material added, if any, depends upon the desired density of the chemical treatment composition. Typically, weight material is added to result in a drilling fluid density of up to about 9 pounds per gallon. The weighted material is preferably added up to 5 pounds per barrel and most preferably up to 50 pounds per barrel of resin blend.

Lost circulation additives may also be incorporated into the formulation. These materials are generally categorized as fibers, flakes, granules, and mixtures. Specific examples include, but are not limited to, ground mica, mica flakes, silica slag, diatomaceous earth, hydrated borate, graded sand, diatomaceous earth, gilsonite, ground coal, charcoal, cellophane flakes or strips, cellulose fiber, expanded perlite, shredded paper or paper pulp, and the like, walnut or other nut hulls ground to different sizes, cottonseed hulls or cottonseed bolls, sugar cane fibers or bagess, flax, straw, ground hemp, ground fir bark, ground redwood bark and fibers, and grape extraction residue, crystalline silicas, amorphous silicas, clays, calcium carbonate, and barite. Suitable amounts of additional solid agents for use in combination with the copolymer(s) and/or ionomer(s) would be apparent to those skilled in the art.

One embodiment of the present invention is a method for reducing or preventing the loss of drilling fluids and other well servicing fluids into a subterranean formation during drilling or construction of a borehole in said formation by providing to the borehole a curable cross-linkable composition comprising: i) from 40 to 90 weight percent of an organic compound capable of free radical (co)polymerization described by the following formula:

wherein: x is an integer from 2 to 8; L is a moiety comprising an aromatic or an aliphatic group derived from a diisocyanate wherein one of the isocyanate groups reacts with a reactive group on $Fp_1$ to form a first bond and the second isocyanate group reacts with a reactive group on $Q_1$ to form a second bond; $Fp_1$ is a moiety derived from an organic compound with a reactive group and one or more free radical polymerizable group wherein the reactive group reacts with a first isocyanate group on L to form a first bond; and $Q_1$ is a moiety derived from a substituted or unsubstituted organic polyol comprising two or more hydroxyl groups wherein the moiety comprises an alkyl group, alkylene group, alkenyl group, cycloalkyl group, cycloalkylene group, aryl group, aralkyl group, alkaryl group, poly(oxyalkylene) group, poly(carboalkoxyalkylene) group, substituted heterocyclic group, or unsubstituted heterocyclic group wherein $Q_1$ has a molecular weight of from 400 to 4,000 wherein each hydroxyl group reacts with am isocyanate on an L to form a urethane link; and ii) from 10 to 60 weight percent of a reactive diluent described by the following formula:

wherein: y is an integer from 2 to 8; $Fp_2$ is a moiety derived from an organic compound with a reactive group which reacts with a hydroxyl group on $Q_2$ to form a bond, $Fp_2$ comprises one or more free radical polymerizable group, and $Fp_2$ may be the same or different than $Fp_1$; and $Q_2$ comprises a substituted or unsubstituted polyol organic radical comprising an alkyl group, an alkylene group, an alkenyl group, a cycloalkyl group, a cycloalkylene group, an aryl group, an aralkyl group, an alkaryl group, a poly(oxyalkylene) group, a poly(carboalkoxyalkylene) group, a substituted heterocyclic group, or an unsubstituted heterocyclic group wherein $Q_2$ has a molecular weight of from 60 to 500 and the each hydroxyl group reacts with the reactive group on an Fp2 to form a bond, $Q_2$ may be the same or different than $Q_1$ wherein weight percent is based on the total weight of the curable cross-linkable composition.

In the process of the present invention, the curable cross-linkable composition described herein above can be added to the zone or zones of lost circulation via the inner diameter of the drill string or down the annulus of the wellbore but outside of the drill string. The initiator can be added to the curable cross-linkable composition before adding the mixture down a wellbore via. Alternatively, the initiator can be added or applied separately down the wellbore such that the curable cross-linkable composition is added via the drill string and the initiator outside of the drill sting or vice versa. Furthermore, a substitute pipe having an appropriately sized inner diameter can be used in place of the drill string. If needed, chemicals can also be added via capillary tubing run down the wellbore.

The following examples will serve to illustrate the invention disclosed herein.

EXAMPLES

In the Examples

"Polyol-1" is a 2-hydroxyethyl methacrylate (HEMA) ($Fp_1$) capped PO polyol ($Q_1$) linked with toluene diisocyanate (TDI) (L) and is synthesized according to Scheme 1 whereby an 8 oz wide-mouth jar is charged with poly(propylene glycol)tolylene 2,4-diisocyanate (50 grams (g), about 0.043 moles of NCO), 2-hydroxyethyl methacrylate (5.6 g, 0.043 moles) and 1-2 drops of Sn(II) stannous octoate (T-9 catalyst). The solution is stirred overnight under nitrogen at ambient temperature. The progress of the reaction is monitored by infrared analysis (IR) analysis, noting the disappearance of the NCO stretching frequency.

The following materials all available from Aldrich:
"Polyol-2" is poly(ethylene glycol)diacrylate having a number average molecular weight (Mn) of 700;
"Polyol-3" is poly(propylene glycol)diacrylate (PG) having a Mn of 800;
"AIBN" is azobisisobutyronitrile;
"Lauryl peroxide"; and
"t-BuOOH" is tert-Butyl hydrogen peroxide.

The compositions for Examples 1 to 12 are shown in Table 1. The samples are prepared by weighing 5 grams (g) of the polyol into a vial and then mixing with 0.1 percent of the appropriate initiator at ambient temperature (about 23° C.). If the initiators are in a solid form (i.e. AIBN, lauryl peroxide), 100 mg of the initiator is dissolved in 1 milliliter (ml) of acetone. For the addition of the initiator (AIBN) to the HEMA-TDI-PO polyol at a temperature above the initiator activation temperature (90° C.), AIBN is dissolved in NMP solvent (100 milligram (mg) in 1 ml).

Sample curing profiles are evaluated using Dynamic Mechanical Analysis (DMA): Sample viscosity is tested using parallel plate fixtures on a TA Instruments ARES Rheometer. A 40 mm top and 50 mm bottom plate are installed on the rheometer to test the samples, and the temperature is ramped from room temperature at 3° C. per minute to 150° C. using the oven controller under nitrogen gas. The gap is set at 1.0 mm. Samples are run in dynamic mode with a strain setting of 100 percent and a frequency of 1 Hertz. The runs are terminated after the G'/G" crossover point is reached.

G' is the storage modulus and G" is the loss modulus. When G'=G", this is defined as the cross-over (when G' and G" lines intersect) or the gel point, in other words where the liquid becomes solid and most of the curing is complete. The storage and loss modulus in viscoelastic solids measure the stored energy, representing the elastic portion, and the energy dissipated as heat, representing the viscous portion.

TABLE 1

| Example | Acrylate Polyol | Initiator | Initiator addition Temperature, ° C. | G'/G" Crossover, ° C. |
| --- | --- | --- | --- | --- |
| 1* | Polyol-1 | t-BuOOH | Ambient | 125.4 |
| 2* | Polyol-1 | Lauryl peroxide | Ambient | 91.5 |
| 3* | Polyol-1 | AIBN | Ambient | 81 |
| 4* | Polyol-2 | t-BuOOH | Ambient | 131.2 |
| 5* | Polyol-2 | Lauryl peroxide | Ambient | 101 |
| 6* | Polyol-2 | AIBN | Ambient | 80.2 |
| 7* | Polyol-3 | t-BuOOH | Ambient | 132.4 |
| 8* | Polyol-3 | Lauryl peroxide | Ambient | 90.4 |
| 9* | Polyol-3 | AIBN | Ambient | 82 |
| 10* | 1:1 - Polyol-1:Polyol-2 | AIBN | Ambient | 85 |
| 11* | 3:1 - Polyol-1:Polyol-2 | AIBN | Ambient | 88 |
| 12* | Polyol-1 | AIBN | 90 | 95 |

*Not examples of the present invention

The following procedure is followed to make Examples 13 and 14: To a 16 oz wide-mouth jar containing a magnetic stir bar is charged with the polyol and toluene 2,4-diisocyanate (TDI). The head space is filled with dry nitrogen and the jar lid is quickly secured, followed by wrapping a piece of black electrical tape around the jar lid seal. The reaction mixture is allowed to stir at ambient temperature for 1 week to yield a prepolymer at which time the % NCO is determined. To the prepolymer is added 2-hydroxyethyl methacrylate (HEMA) and 2-3 drops of dibutyltin dilaurate. The resulting solution is stirred at ambient temperature overnight. The progress and completion of the reaction is monitored by infrared analysis and is considered complete with the disappearance of the NCO stretching frequency. The curable cross-linkable composition is isolated and no further purification is performed. The amounts of polyol for Examples 13 and 14, TDI, and HEMA are shown in Table 2. In Table 2:

"HEMA" is 2-hydroxyethyl methacrylate;

"TDI" is tolylene-2,4-diisocyanate;

"Polyol-4" is a polypropylene oxide polyol with a hydroxy equivalent weight (HEW) of 1000 available as P2000™ from The Dow Chemical Company;

"Polyol-5" is 12.7% EO capped poly(propylene glycol) having a HEW of 1000 available as VORANOL™ 9287V from The Dow Chemical Company; and Example 13 is an organic compound capable of free radical (co)polymerization as shown in Scheme 1.

Example 14 is an organic compound capable of free radical (co)polymerization as shown in Scheme 3:

"Polyol-6" is the reactive diluent 1,3-propanediol, 2-ethyl-2-(hydroxymethyl)-triacrylate having the following structure:

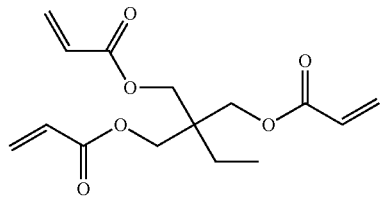 [SMILES: C=CC(=O)OCC(CC)(COC(=O)C=C)COC(=O)C=C]

Compressive Strength determined according to ASTM D695 is performed on Examples 15 to 26. Samples having only an organic compound capable of free radical polymerization and samples of the organic compounds capable of free radical polymerization plus a reactive diluent are evaluated with three different sands. The three sand sizes are: 50 to 70 mesh sand, 4 to 16 mesh fused silicon dioxide, granular, and silicone dioxide fused pieces less than 4 mm.

For Examples 15 to 26, about 25 g of sand, 15-17 g of all reactive organic components capable of free radical polymerization (Example 12 or 13), and about 0.25 mL of NMP (N-methyl-2-pyrrolidone) containing 50 mg of AIBN are

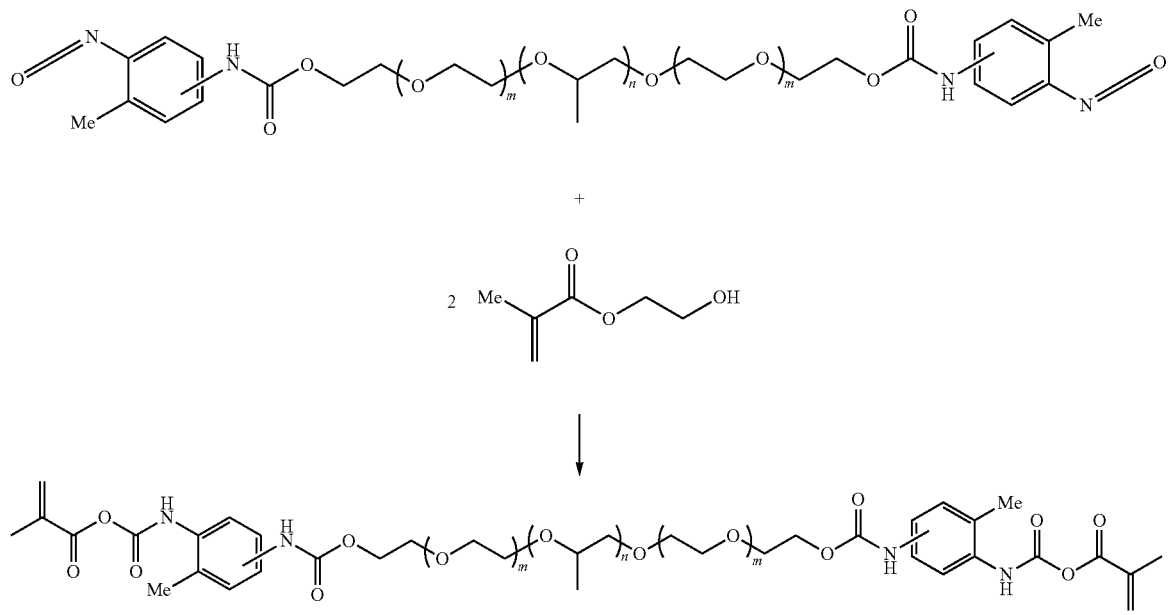

Scheme 3

TABLE 2

|  | Polyol-4, g (mol) | Polyol-5, g (mol) | TDI, g (mol) | HEMA, g (mol) |
| --- | --- | --- | --- | --- |
| Example 13 | 421 (0.21) |  | 79 (0.45) | 50.3 (0.39) |
| Example 14 |  | 193 (0.097) | 33.6 (0.2) | 26 (0.2) | mixed together by hand and poured into a cylindrical mold measuring 0.5" (diameter)×3" (length), and the sand filled mixtures are then cured at 150° C. for 15 minutes in an oven. Following the polymer cure, the resulting columns are cut into segments having a 1" length and tested according to ASTM D695. Average peak stress and average modulus are reported in pounds per square inch (psi in Table 3). Average peak stress and modulus values (and their ranges) are the result of three runs.

TABLE 3

| Example | Organic Compound | Organic Compound, g | Reactive Diluent, g | Wt % of Reactive Diluent | Size of Sand | Avg. Peak Stress (psi) | Avg. Modulus (psi) |
|---|---|---|---|---|---|---|---|
| 15 | Ex 12 | 11.7 | 3.3 | 22 | 50-70 mesh | 1466 ± 296 | 20695 ± 320 |
| 16 | Ex 13 | 11.7 | 3.3 | 22 | 50-70 mesh | 1440 ± 168 | 22954 ± 1985 |
| 17* | Ex 12 | 15 | | | 50-70 mesh | 419 ± 36 | 5001 ± 1336 |
| 18* | Ex 13 | 15 | | | 50-70 mesh | 245 ± 36 | 3021 ± 1274 |
| 19 | Ex 12 | 11.7 | 3.3 | 22 | 4-16 mesh | 398 ± 14 | 10013 ± 685 |
| 20 | Ex 13 | 11.7 | 3.3 | 22 | 4-16 mesh | 466 ± 77 | 11513 ± 232 |
| 21* | Ex 12 | 16 | | | 4-16 mesh | 160 ± 45 | 2564 ± 537 |
| 22* | Ex 13 | 15 | | | 4-16 mesh | 105 ± 35 | 1595 ± 233 |
| 23 | Ex 12 | 11.7 | 3.3 | 22 | <4 mm | 471 ± 31 | 11768 ± 1227 |
| 24* | Ex 12 | 15 | | | <4 mm | 137 ± 43 | 2140 ± 686 |
| 25 | Ex 12 | 13.3 | 1.6 | 11 | 50-70 mesh | 650.4 | 10401 ± 2385 |
| 26* | Ex 12 | 14.2 | 5.5 | 5.5 | 50-70 mesh | 480 ± 25 | 6702 ± 1433 |

*Not examples of the present invention

What is claimed is:

1. A method for reducing the loss of drilling fluids and other well servicing fluids into a subterranean formation during drilling or construction of a borehole in said formation comprising the steps of:
   A providing to the subterranean formation a curable cross-linkable composition comprising:
      i from 40 to 90 weight percent of an organic compound capable of free radical (co)polymerization which is a reaction product of:
         a a diisocyanate capped polyester polyol ($Q_1$) having a molecular weight of from 400 to 4,000
         and
         b a hydroxylated (meth)acrylate compound ($F_{p1}$) having a terminal hydroxyl group
      wherein the reaction product is described by the following formula:

wherein:
      x is an integer from 2 to 8;
      and
      L is a urethane link between the hydroxylated (meth)acrylate compound ($F_{p1}$) and the diisocyanate capped polyether polyol ($Q_1$);
      ii from 10 to 60 weight percent of one or more reactive diluent selected from trimethylolpropanetri(meth)acrylate, glycerine tri(meth)acrylate, pentaerythritol tetra(meth)acrylate, triethyleneglycol dimethacrylate, ethyleneglycol dimethacrylate, tetraethyleneglycol dimethacrylate, polyethyleneglycol diacrylate, polyethyleneglycol dimethacrylate, 1,3-butyleneglycol dimethacrylate, trimethylol propane trimethacrylate, neopentylglycoldimethacrylate, ethoxylated Bisphenol A dimethacrylate, Bisphenol F dimethacrylate, propoxylated Bisphenol C dimethacrylate, Bisphenol A bis(2-hydroxy-propyl)dimethacrylate, or butanediol di(meth)acrylate
      wherein weight percent is based on the total weight of the curable cross-linkable composition, and (iii) one or more inhibitor
   B curing the curable cross-linkable composition in-situ downhole, and
   C reducing the loss of drilling fluids and other well servicing fluids into the subterranean formation.

2. The method of claim 1 wherein the diisocyanate capped polyether polyol ($Q_1$) is derived from a polyethylene oxide polyol, a polypropylene oxide polyol, a polybutylene oxide polyol, a copolymer of polyalkylene oxide polyol, a terpolymer of polyalkylene oxide polyol, a polytetramethylene oxide polyol, or a polyalkylene oxide based on a polyol.

3. The method of claim 1 wherein the diisocyante capped polyether polyol ($Q_1$) is derived from a polyethylene oxide polyol or a polypropylene oxide polyol.

4. The method of claim 1 wherein the hydroxylated (meth)acrylate compound ($F_{p1}$) is hydroxyethylmethacrylate, hydroxyethylacrylate, or hydroxybutylacrylate.

5. The method of claim 1 further comprises one or more initiator comprising a peroxide, a peroxy ester, a peroxy carbonate, a hydroperoxide, an alkylperoxide, an arylperoxide, an azo compound, or mixtures thereof.

6. The method of claim 5 wherein the initiator comprises benzoyl peroxide, tert-butyl peroxide, dicumyl peroxide, hydrogen peroxide, diethyl peroxide, azobisisobutyronitrile, or mixtures thereof.

7. The method of claim 6 wherein the one or more initiator is independently present in an amount equal to or greater than 0.1 weight percent and equal to or less than 10 weight percent based on the total weight of the curable cross-linkable composition.

8. The method of claim 1 wherein the one or more inhibitor is hydroquinone, butylated hydroxytoluene (BHT), butylated hydroxyaniline (BHA), 2-hydroxy-4-methoxy benzophenone (UV-9), methyl ether hydroquinone (MEHQ), 4-benzyloxy phenol, 3,5-diisopropyl phenol, or mixtures thereof.

9. The method of claim 8 wherein the one or more inhibitor is independently present in an amount equal to or greater than 0.1 weight percent and equal to or less than 10 weight percent based on the total weight of the curable cross-linkable composition.

10. The method of claim 1 wherein the diisocyanate capped polyether polyol ($Q_1$) is a reaction product of a polyether polyol with toluene diisocyanate (TDI), diphenylmethane diisocyanate (MDI), hexamethylene-1,6-diisocyanate (HDI), naphthalene diisocyanate (NDI), methylene bis-cyclohexylisocyanate (HMDI or hydrogenated MDI), or isophorone diisocyanate (IPDI).

* * * * *